US011151141B2

(12) United States Patent
Fujikawa et al.

(10) Patent No.: US 11,151,141 B2
(45) Date of Patent: Oct. 19, 2021

(54) DATA PROCESSING DEVICE AND DATA PROCESSING METHOD

(71) Applicant: HITACHI, LTD., Tokyo (JP)

(72) Inventors: Yoshifumi Fujikawa, Tokyo (JP);
Toshiyuki Aritsuka, Tokyo (JP);
Satoru Watanabe, Tokyo (JP);
Kazushi Nakagawa, Tokyo (JP);
Kazuhisa Fujimoto, Tokyo (JP);
Masahiro Arai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 158 days.

(21) Appl. No.: 16/549,447

(22) Filed: Aug. 23, 2019

(65) Prior Publication Data

US 2020/0265052 A1    Aug. 20, 2020

(30) Foreign Application Priority Data

Feb. 18, 2019    (JP) .............................. JP2019-026861

(51) Int. Cl.
*G06F 16/245*    (2019.01)
*G06F 16/22*    (2019.01)
*G06F 16/2453*    (2019.01)

(52) U.S. Cl.
CPC ...... *G06F 16/24569* (2019.01); *G06F 16/221* (2019.01); *G06F 16/2282* (2019.01); *G06F 16/24542* (2019.01)

(58) Field of Classification Search
CPC ................. G06F 16/2455; G06F 16/24; G06F 16/24542; G06F 16/24568; G06F 16/2471; G06F 16/2474; G06F 3/067; G06F 9/544

USPC ......................................................... 707/722
See application file for complete search history.

(56) References Cited

U.S. PATENT DOCUMENTS

| 10,324,915 | B2 | 6/2019 | Saeki et al. |
| 2010/0088315 | A1* | 4/2010 | Netz ...................... G06F 16/221 |
| | | | 707/737 |
| 2017/0046363 | A1* | 2/2017 | Morita .................... G06F 16/25 |

FOREIGN PATENT DOCUMENTS

JP    2017-138892 A    8/2017

* cited by examiner

*Primary Examiner* — Hung T Vy
(74) *Attorney, Agent, or Firm* — Baker Botts L.L.P.

(57) ABSTRACT

It is possible execute processing large-scale data and improve the processing efficiency while suppressing the complexity of a hardware circuit. A data processing device includes a processor and a FPGA connected to the processor. The processor is configured to acquire a query plan including target identification information identifying data to be processed and a processing detail for the data to be processed, generate, based on the query plan, a plurality of FPGA commands to process a plurality of row group data items constituting the data identified by the target identification information and to be processed, and transmit the FPGA commands to the FPGA. The FPGA is configured to execute processing on the row group data items based on the transmitted FPGA commands and return results of executing the processing to the processor.

13 Claims, 5 Drawing Sheets

DATA PROCESSING DEVICE AND DATA PROCESSING METHOD

CLAIM OF PRIORITY

The present application claims priority to Japanese Patent Application No. 2019-026861 filed on Feb. 18, 2019, the content of which is hereby incorporated by reference into this application.

BACKGROUND

The present invention relates to a technique for executing data processing by a data processing device having a hardware circuit in addition to a processor.

It is requested to effectively use various large-scale data (so-called big data) such as mission-critical data that is generated, accumulated, and updated daily, information of manufacturing sites and customers, and information collected via social media, and to quickly extract and analyze information necessary for business execution. In order to quickly capture changes and determine situations, an interactive analysis environment for responding in nearly real time and interpreting data with different points of view is required for the business data analysis. In addition, it is expected that future self-service business data analysis will be performed by many business users and that results of the analysis will be immediately used for actual business.

To process a large amount of data at a high speed, it is necessary that a data processing server having a high-performance processor to secure computational performance be used or that many general-purpose data processing servers be prepared. Especially, in the case where large-scale data is to be analyzed, a distributed data processing system may be used, which is Hadoop (registered trademark) or the like and uses a distributed infrastructure with many data processing servers to execute data processing in parallel. As a result, the size of the system is increased and the cost of introducing and maintaining the system increases.

To handle this, the following technique is considered. That is, the technique is to suppress an increase in the size of a system by using a server with an accelerator to improve computational performance. The accelerator such as a field programmable gate array (FPGA), general-purpose computing on graphics processing units (GPGPU), a dedicated application specific integrated circuit (ASIC), or the like can execute data processing at a high speed.

For example, Japanese Unexamined Patent Application Publication No. 2017-138892 discloses a technique for causing an FPGA to acquire meta information and storage position information of positions of data on storage from database management software, causing the FPGA to interpret the meta information, causing the FPGA to determine a data size able to be processed, acquiring data in units of the determined size from the storage (or data that has been loaded in a server memory from the storage and is to be processed), and sequentially processing the data.

SUMMARY

In the technique described in Japanese Unexamined Patent Application Publication No. 2017-138892, computational performance can be improved by managing data of a table for each of segments having a predetermined size.

However, in the distributed data processing system that is Hadoop or the like and is used for large-scale data processing, data of a database is divided into multiple files, and the files are stored in multiple servers. The files, however, are stored in different data formats. The data is variable-length data, and meta information has a variable-length structure. Thus, the distributed data processing system is not supported by the technique described in Japanese Unexamined Patent Application Publication No. 2017-138892.

To enable a hardware circuit such as an FPGA to support the variable-length data, the variable-length meta information, and the like, it is necessary to prepare a circuit for executing processing based on the target formats and the target structure. Thus, there is a problem that the hardware circuit is complex and the cost of forming the hardware circuit is high. Since the size of the hardware circuit is limited, there is a problem that it is difficult to support the structure.

The present invention has been devised under the aforementioned circumstances, and an object of the invention is to provide a technique for executing processing on large-scale data and improving the processing efficiency.

To achieve the aforementioned object, a data processing device according to an aspect of the invention includes a processor and a hardware circuit connected to the processor. The processor is configured to acquire a first command including target identification information identifying data to be processed and a processing detail for the data to be processed, generate, based on the first command, a plurality of second commands to process a plurality of partial data items constituting the data identified by the target identification information and to be processed, and transmit the second commands to the hardware circuit. The hardware circuit is configured to execute processing on the partial data items based on the transmitted second commands and return results of executing the processing to the processor.

According to the aspect of the invention, it is possible to suppress the complexity of the hardware circuit, execute processing on large-scale data, and improve the processing efficiency.

DETAILED DESCRIPTION

An embodiment is described with reference to the accompanying drawings. The following embodiment does not limit the invention defined in the appended claims. Not all components described in the embodiment and not all combinations of the components may be necessarily required to carry out the invention.

Figure 1:
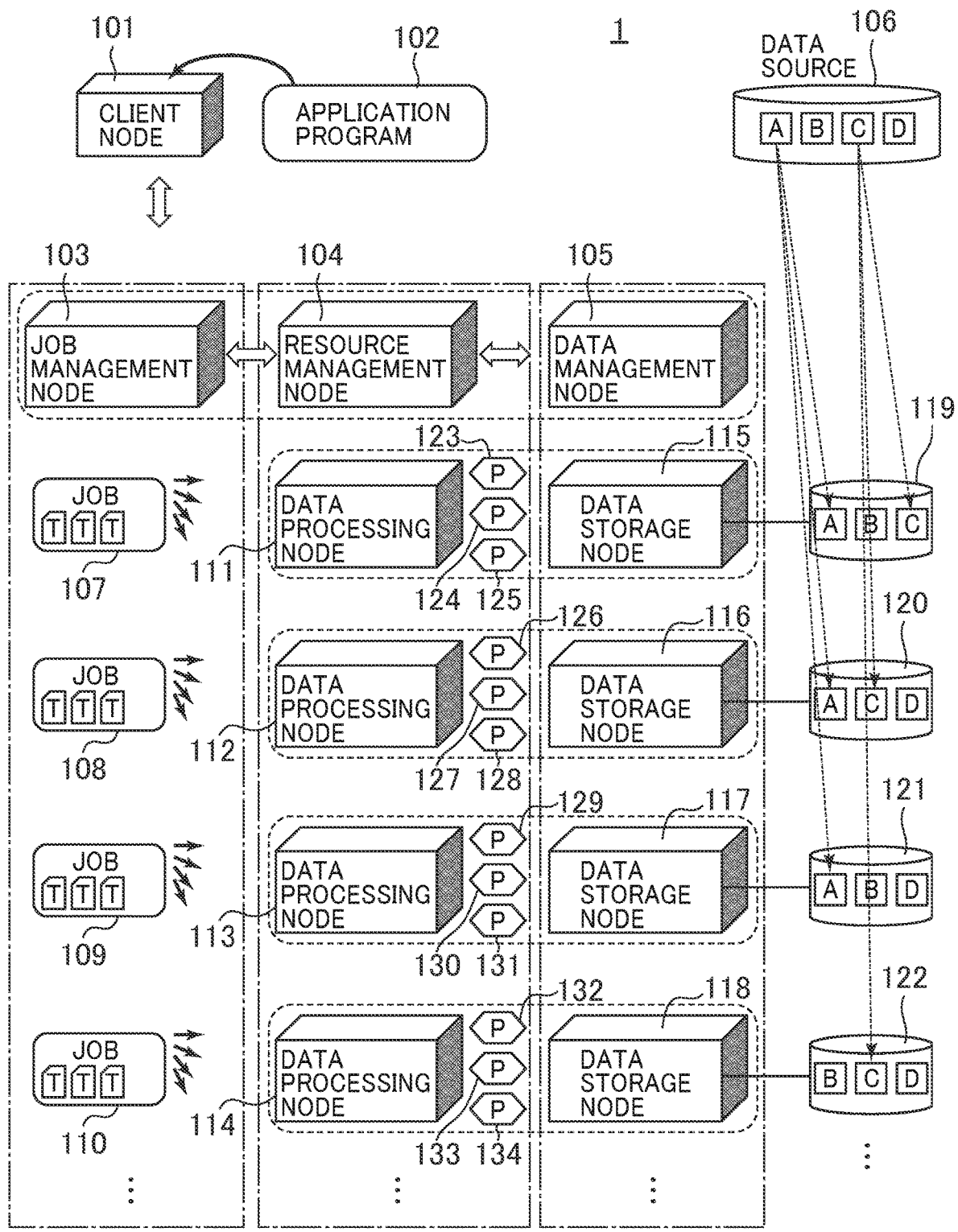
FIG. 1 is a diagram depicting a whole configuration of a distributed database system according to an embodiment.

FIG. 1 is a diagram depicting a whole configuration of a distributed database system according to the embodiment.

The distributed database system 1 includes a client node 101, a job management node 103, a resource management node 104, a data management node 105, data processing nodes 111 to 114, and data storage nodes 115 to 118. The nodes may be physical computers or may be virtual computers such as virtual machines (VMs). The nodes are connected to each other via a general computer network such as Ethernet (registered trademark) (the connection is not depicted in FIG. 1). The nodes transmit and receive a control signal and data to and from each other via the network. For example, the multiple nodes may be connected to each other via a network (local area network (LAN)) closed in a local domain. Alternatively, the multiple nodes may be installed in different domains or in different data centers or the like, and the nodes installed in the domains may be connected to each other via a global network (wide area network (WAN)). Alternatively, the data processing nodes and the data storage nodes may be connected to each other via a storage area network (SAN).

The client node 101 is, for example, a computer including a processor, a memory, and a network interface. The client node 101 may further include a user interface for operating a storage device and the computer. The client node 101 executes various processes by causing the processor to execute an application program 102 loaded in the memory. For example, the application program 102 may be transmitted via the network or may be stored in the storage device of the client node 101 in advance. The application program 102 may be input via the user interface.

The application program 102 includes a command to execute data processing using the distributed database system 1. The processor executes the application program 102, thereby calling the command to execute the data processing. The data processing is executed based on the command in the distributed database system 1.

The job management node 103 is, for example, a computer including a processor, a memory, a network interface. The job management node 103 may further include a user interface for operating a storage device and the computer. The job management node 103 receives a data processing command issued by the application program 102 executed in the client node 101 and configures jobs 107 to 110 and the like for executing data processing in the distributed database system 1. In addition, the job management node 103 generates tasks, which are units of distributing the data processing based on the jobs to the multiple data processing nodes 111 to 114 and the like and causing the data processing nodes 111 to 114 and the like to execute the data processing. For example, in a Hadoop distributed processing system, a mapping process and a reduction process are combined and units of executing the data processing correspond to the jobs. In addition, the mapping process and the reduction process correspond to the tasks. The tasks are distributed to and executed by the multiple data processing nodes 111 to 114 and the like. The job management node 103 requests the resource management node 104 to use the data processing nodes 111 to 114 and the like in order to cause the data processing nodes 111 to 114 and the like to execute the generated tasks.

The resource management node 104 is, for example, a computer including a processor, a memory, and a network interface. The resource management node 104 may further include a user interface for operating a storage device and the computer. The resource management node 104 receives the request to use the data processing nodes 111 to 114 and the like for executing the tasks from the job management node 103, selects an available data processing node from among the data processing nodes 111 to 114 and the like based on resource management information, installs the tasks in the selected data processing node, and causes the selected data processing node to execute the tasks. In addition, the resource management node 104 schedules the order in which one or more jobs configured by the job management node 103 are executed, execution rates of the jobs, and the like based on requirements such as priorities.

The data management node 105 is, for example, a computer including a processor, a memory, and a network interface. The data management node 105 may further include a user interface for operating a storage device and the computer. The data management node 105 acquires data to be processed by the distributed database system 1 from a data source 106, divides the data into blocks (data blocks) with a specified divided size, and causes the blocks to be stored in the data storage nodes 115 to 118. In this case, one or more copies of each of the blocks may be generated and the copies may be distributed to and stored in multiple nodes in order to secure the availability and reliability of the data and not to lose the data when a specific node is stopped.

In the distributed database system 1, two or all of the job management node 103, the resource management node 104, and the data management node 105 may be included in the same physical computer. In the distributed database system 1, the client node 101 and one or all of the job management node 103, the resource management node 104, and the data management node 105 may be included in the same physical computer.

The data processing nodes 111 to 114 execute tasks set by the resource management node 104. In this case, the data processing nodes 111 to 114 are connected to partitions 123 to 134 and execute data processing for each of the tasks. The partitions 123 to 134 are logical data units set in advance.

The data storage nodes 115 to 118 store the data blocks specified and installed by the data management node 105 in storage devices 119 to 122, such as hard disk drives, flash memory devices, or the like included in the respective data storage nodes. One or more of the data blocks of the data storage nodes are assigned to each of the partitions 123 to 134 set for the data processing nodes 111 to 114. The tasks of the data processing nodes 111 to 114 access the assigned data blocks via the partitions that are logical data.

FIG. 1 depicts an example of a configuration of the distributed database system. As another example of the configuration, the data processing nodes and the data storage nodes may be included in the same physical computer. When a task on a data processing node and data to be processed by the task are included in the same physical computer, a data transfer speed is not limited by network bandwidth performance between nodes, and a rate at which the task accesses the data may be high. In each of the data processing nodes, a node management program (not depicted) for managing resources of the node is executed. Anode that is not the data processing nodes and is configured to execute the node management program may be prepared and connected to the data processing nodes via the network and may manage the data processing nodes. In this case, job execution performance of the data processing nodes is not affected by a load of the node management program.

Figure 2:
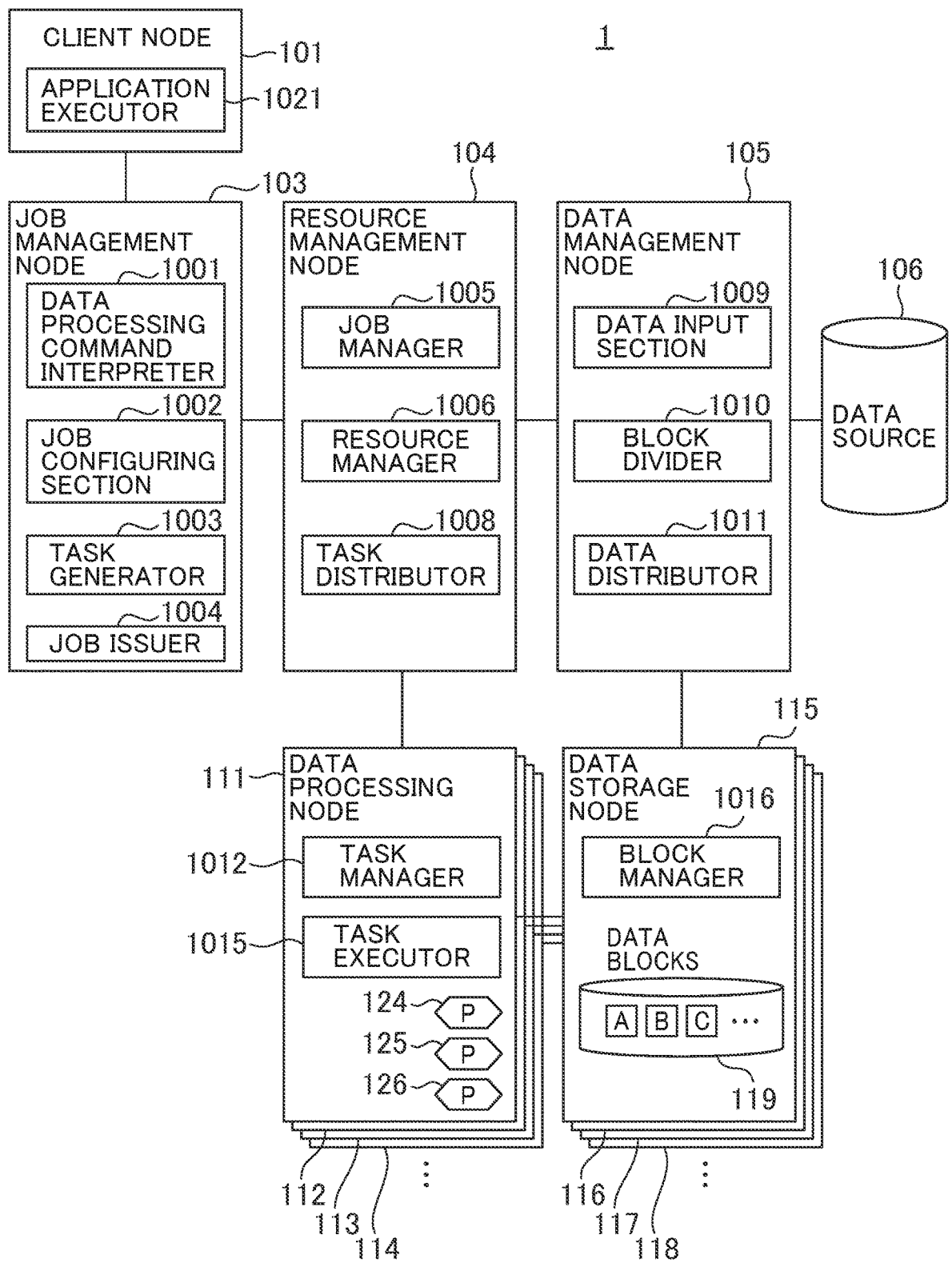
FIG. 2 is a diagram depicting a functional configuration of the distributed database system according to the embodiment.

FIG. 2 is a diagram depicting a functional configuration of the distributed database system according to the embodiment.

The client node 101 includes an application executor 1021 that is configured by causing the processor to execute the application program 102. The application executor 1021 of the client node 101 issues a data processing command (for example, an SQL command) to the job management node 103.

The job management node 103 includes a data processing command interpreter 1001, a job configuring section 1002, a task generator 1003, and a job issuer 1004. In the job management node 103, the data processing command interpreter 1001 interprets the data processing command issued by the application executor 1021. The job configuring section 1002 configures an executable job based on a result of interpreting the data processing command by the data processing command interpreter 1001. The task generator 1003 generates a task, which is to be distributed to, installed in, and executed by one or more of the data processing nodes 111 to 114 and the like, so that the task is associated with the configured job. The job issuer 1004 requests the resource management node 104 to provide resources included in the data processing nodes 111 to 114 and the like and managed by the resource management node 104, and issues, to the assigned one or more data processing nodes, the job and the task, which is a component of the job.

The resource management node 104 includes a job manager 1005, a resource manager 1006, and a task distributor 1008. The job manager 1005 schedules issued one or more jobs based on a requirement such as a priority, the order in which the one or more jobs have been issued, or the utilization of the computational resources. The assigned one or more data processing nodes execute the one or more jobs. The resource manager 1006 manages resource components such as computing devices and memories of the data processing nodes 111 to 114 and the like included in the distributed database system 1. The task distributor 1008 distributes a task based on available resources of the data processing nodes 111 to 114 and the like.

The data managing node 105 distributes and installs the data source to be processed by the application executor 1021 within the distributed database system 1. The data management node 105 includes a data input section 1009, a block divider 1010, and a data installer 1011. The data input section 1009 acquires data from the data source 106 and converts the acquired data into data in a format suitable for a distribution process if necessary. The block divider 1010 divides the data of the data source 106 into blocks with a preset block size. The data installer 1011 causes the data blocks 106 to be stored in the data storage nodes 111 to 118 and the like paired with the data processing nodes 111 to 114 and the like for each data amount based on data processing performance of the data processing nodes 111 to 114 and the like.

Each of the data storage nodes 115 to 118 and the like includes a block manager 1016 and a storage section 119. The storage section 119 stores data blocks. The block manager 1016 manage access to the data blocks stored in the concerned data storage node from tasks executed by the data processing nodes 111 to 114 and the like.

Each of the data processing nodes 111 to 114 and the like includes a task manager 1012 and a task executor 1015. The task manager 1012 manages the order in which tasks included in the concerned data processing node are executed, and manages the assignment of the tasks to a computing device for executing the tasks. The task executor 1015 executes a task installed in the concerned data processing node, uses data of data blocks assigned to partitions (124, 125, 126, and the like) associated with the task, to execute the task.

Figure 3:
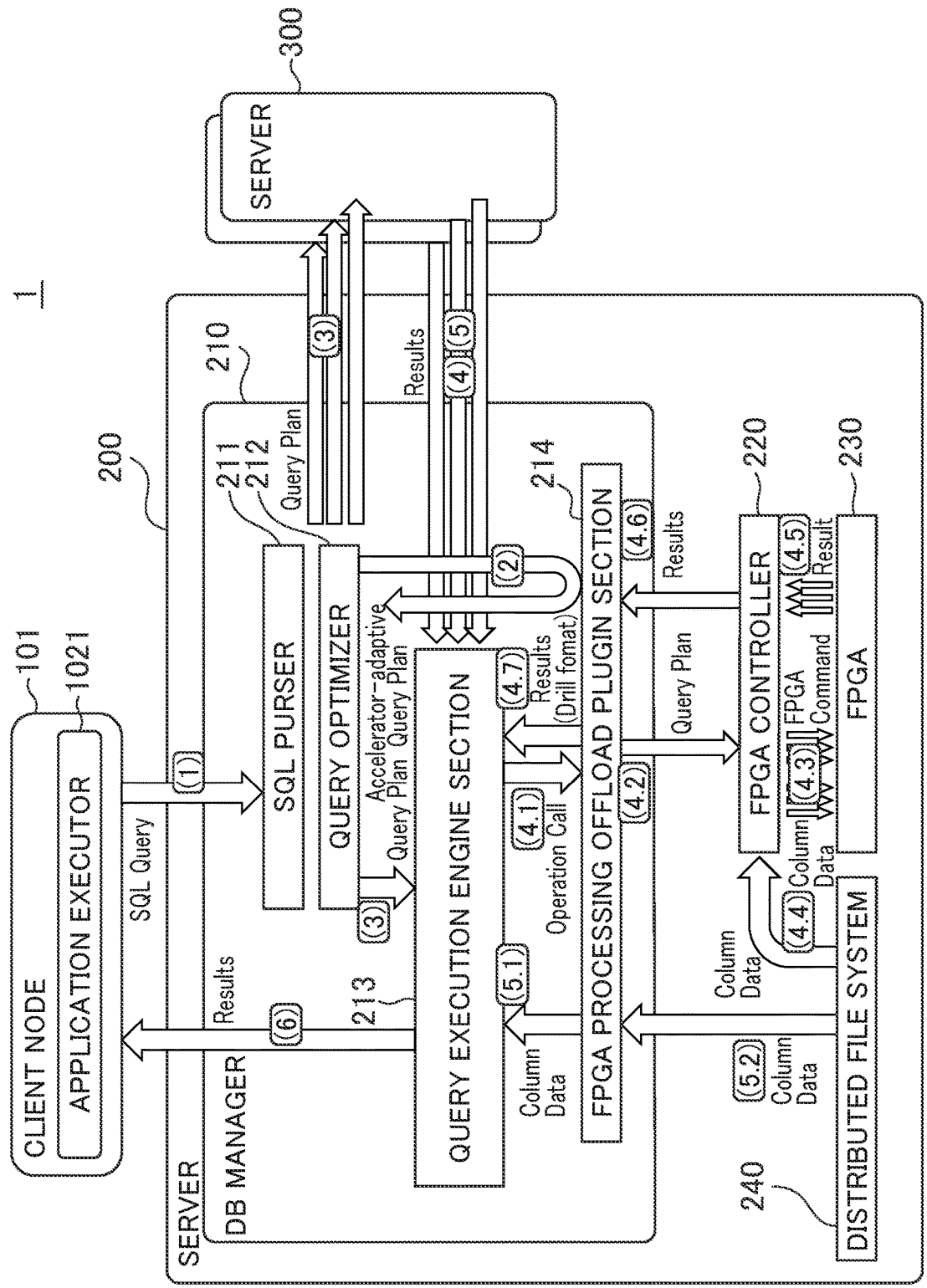
FIG. 3 is a diagram describing an overview of a whole process of the distributed database system according to the embodiment.

FIG. 3 is a diagram describing an overview of a whole process of the distributed database system according to the embodiment.

The distributed database system 1 depicted in FIG. 3 includes the client node 101, a server 200 as an example of a data processing device, and a server 300. In an example depicted in FIG. 3, the server 200 includes the job management node 103, the resource management node 104, the data management node 105, one data processing node (one of the data processing nodes 111 to 114 and the like), and one data storage node (one of the data storage nodes 115 to 118 and the like), which are depicted in FIG. 1, for example. The server 300 includes a data processing node and a data storage node, which are depicted in FIG. 1, for example.

The server 200 includes a DB manager 210, an FPGA controller 220, an FPGA 230 as an example of a hardware circuit, and a distributed file system 240.

The distributed file system 240 is, for example, a Hadoop distributed file system (HDFS) and manages data while treating files (HDFS files; high-level files) as units. The distributed file system 240 manages data blocks of the data storage nodes 115 to 118 and the like so that the data blocks are identifiable. In the data storage nodes 115 to 118 and the like, data belonging to the HDFS files is distributed and stored. In the embodiment, the distributed file system 240 manages a table indicating association relationships between the names of the HDFS files and the names of files (for example, files managed by OSs of the servers) recognizable by the servers 200 and 300 that manage the data of the data blocks constituting the HDFS files.

The DB manager 210 manages a process such as a data search to be executed in the distributed database system 1. The DB manager 210 includes an SQL purser 211, a query optimizer 212, a query execution engine section 213, and an FPGA processing offload plugin section 214. The SQL purser 211, the query optimizer 212, and the query execution engine section 213 are, for example, configured by causing a central processing unit (CPU) 202 to execute existing database management software (for example, open source software (OSS) such as Drill). The FPGA processing offload plugin section 214 is configured by causing the CPU 202 to execute a program that can be plugged in the existing database management software. The FPGA processing offload plugin section 214 changes a valid portion of a process included in a query plan and to be executed by the FPGA controller 220 and the FPGA 230 to a query plan including a mechanism for offloading data to a path to be used for the process by the FPGA controller 220 and the FPGA 230.

A process to be executed in the distributed database system 1 is described below.

In the client node 101, the application executor 1021 for executing an application such as a business intelligence (BI) tool issues an SQL command to the server 200 ((1) depicted in FIG. 3).

The SQL purser 211 of the DB manager 210 of the server 200 receives the SQL command, analyzes the SQL command, and gives a result of analyzing the SQL command to the query optimizer 212. The query optimizer 212 generates an execution plan (query plan) for a query based on the result of analyzing the SQL command and transmits the generated query plan to the FPGA processing offload plugin section 214.

The FPGA processing offload plugin section 214 generates a query plan for causing the FPGA controller 220 and the FPGA 230 to execute the valid portion of the process included in the query plan and to be executed by the FPGA controller 220 and the FPGA 230, and gives the generated query plan to the query optimizer 212 ((2) depicted in FIG. 3).

The query optimizer 212 gives the query plan received from the FPGA processing offload plugin section 214 to the query execution engine section 213 ((3) depicted in FIG. 3). The query optimizer 212 may transmit the query plan to the query execution engine section 213 and the server 300 simultaneously, and the server 300 may execute the query.

The query execution engine section 213 executes the query in accordance with the received query plan. In this case, the query execution engine section 213 gives, to the FPGA processing offload plugin section 214, a query processing command set to be executed by the FPGA 230 in the query plan ((4.1) depicted in FIG. 3). The FPGA processing offload plugin section 214 gives, to the FPGA controller 220, the query processing command set to be executed by the FPGA 230 in the query plan ((4.2) depicted in FIG. 3).

The FPGA controller 220 converts the received query plan into multiple commands (FPGA commands) in a predetermined format executable by the FPGA 230 and transmits the FPGA commands to the FPGA 230 ((4.3) depicted in FIG. 3). The FPGA controller 220 reads, via the distributed file system 240, a data file to be processed by the FPGA 230 based on the FPGA commands and causes the data file to be stored in a data buffer of a main memory device 203 (described later) of the server 200 ((4.4) depicted in FIG. 3).

The FPGA 230 receives the FPGA commands, reads data stored in the data buffer in accordance with the FPGA commands, and executes data processing described in the FPGA commands. The FPGA 230 gives a result of executing the data processing to the FPGA controller 220 ((4.5) depicted in FIG. 3).

When the FPGA controller 220 acquires, from the FPGA 230, results of executing all processing corresponding to the multiple FPGA commands generated based on the query plan, the FPGA controller 220 aggregates the execution results and gives the aggregated execution results as execution results for the query processing command to the FPGA processing offload plugin section 214 ((4.6) depicted in FIG. 3). The FPGA processing offload plugin section 214 gives the execution results to the query execution engine section 213 ((4.7) depicted in FIG. 3). Specifically, the FPGA processing offload plugin section 214 causes the execution results to be stored in the main memory device 203 so that the execution results are in a format for a result of processing by the query execution engine section 213.

When a query processing command to be executed by the query execution engine section 213 without the FPGA 230 is included in the query plan, the query execution engine section 213 acquires data from the distributed file system 240 and executes processing on the data ((5.1) and (5.2) depicted in FIG. 3).

After that, the query execution engine section 213 collects the result of the data processing by the FPGA 230, the result of the processing executed by the query execution engine section 213, and processing results from the server 300 as processing results for the SQL command and transmits the processing results for the SQL command to the application executor 1021 of the client node 101 ((6) depicted in FIG. 3).

Next, a hardware configuration of the server 200 is described.

Figure 4:
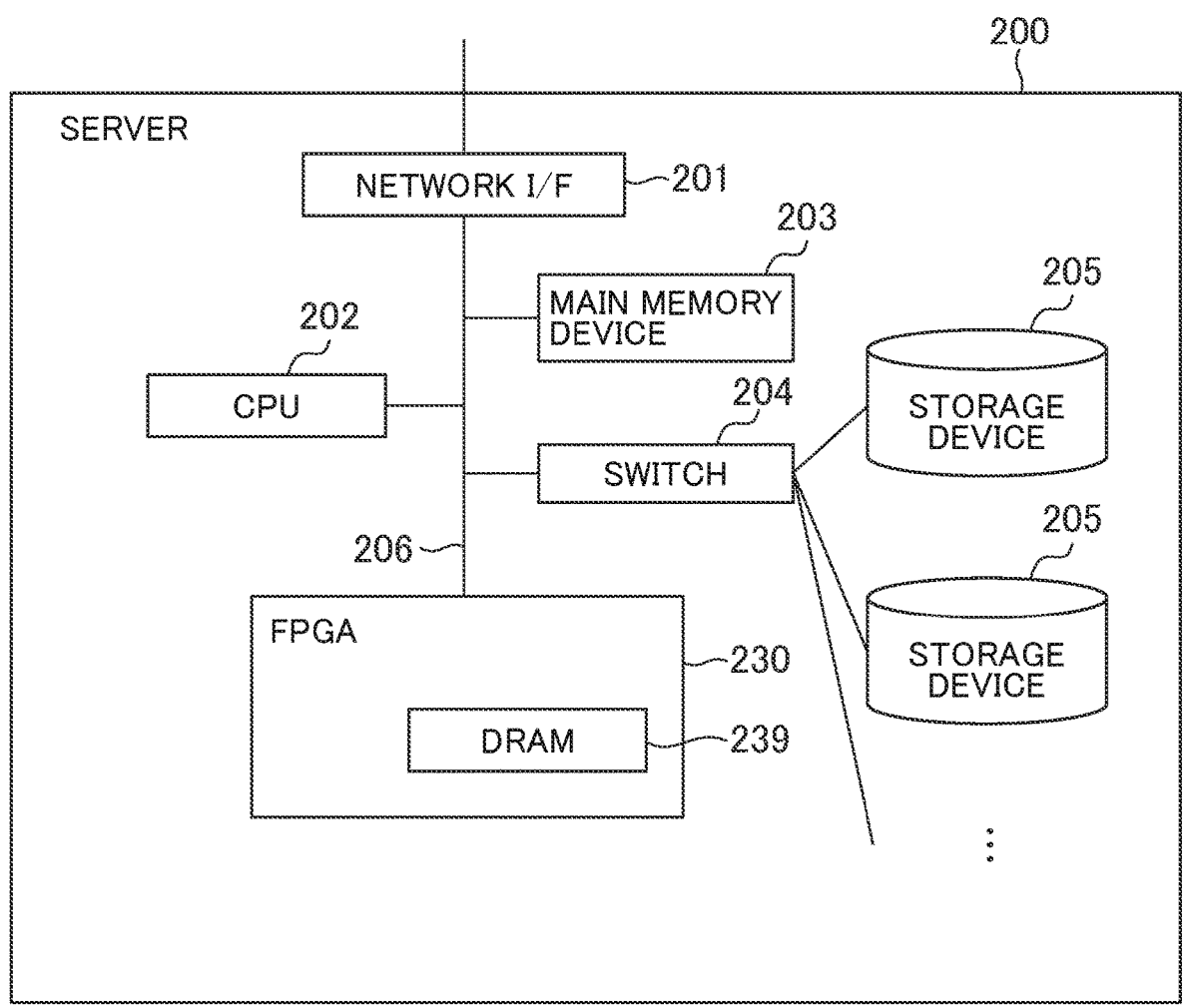
FIG. 4 is a diagram depicting a hardware configuration of a server according to the embodiment.

FIG. 4 is a diagram depicting the hardware configuration of the server according to the embodiment.

The server 200 includes a network interface (I/F) 201, the CPU 202 as an example of a processor, the main memory device 203, a switch 204, one or more storage devices 205, and the FPGA 230. The network I/F 201, the CPU 202, the main memory device 203, the switch 204, and the FPGA 230 are connected to each other via an internal bus 206. The server 300 may have the same configuration as the server 200.

The network I/F 201 is, for example, an interface such as a wired LAN card or a wireless LAN card and communicates with other devices (for example, the client node 101, the other server 300, and the like) via a network.

The CPU 202 executes various processes in accordance with a program stored in one or both of the main memory device 203 and the storage devices 205.

The main memory device 203 is, for example, a random access memory (RAM) and stores necessary information such as programs (database management program, FPGA control middleware, and the like) to be executed by the CPU 202.

The switch 204 connects the multiple storage devices 205 to the network I/F 201, the CPU 202, the main memory device 203, and the FPGA 230, which are located on the side of the internal bus 206.

The storage devices 205 are, for example, hard disk drives, flash memory devices, or the like and store the programs to be executed by the CPU 202 and data to be used by the CPU 202. The storage devices 205 store block data storing data constituting files managed by the distributed file system 240.

Next, a functional configuration of the server 200 is described in detail.

Figure 5:
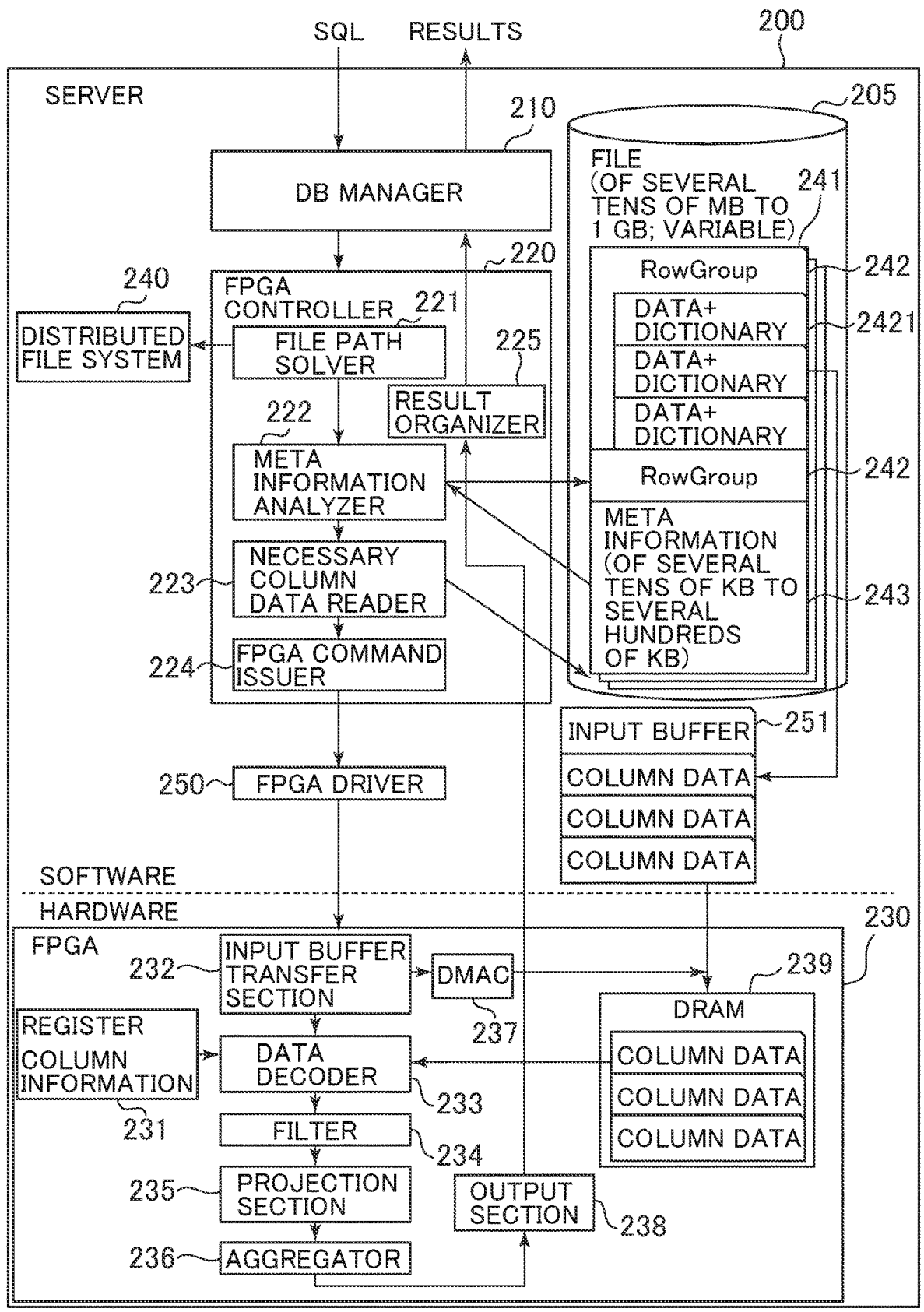
FIG. 5 is a diagram depicting a functional configuration of the server according to the embodiment.

FIG. 5 is a diagram depicting the functional configuration of the server according to the embodiment.

The server 200 includes the DB manager 210, the FPGA controller 220, the FPGA 230, the distributed file system 240, an FPGA driver 250, an input buffer 251, and the storage devices 205.

The FPGA driver 250 is configured by causing the CPU 202 to execute an FPGA driver program. The FPGA driver 250 enables the FPGA controller 220 to control the FPGA 230. The input buffer 251 is a region that is used to transfer, to the FPGA 230, data to be processed based on a command. The input buffer 251 has a capacity sufficient to enable the input buffer 251 to be stored in a DRAM 239 of the FPGA 230. The input buffer 251 may be a partial region of the main memory device 203, for example.

In the server 200 according to the embodiment, each of the storage devices 205 stores an HDFS file (high-level file) to be processed in the distributed file system 240. The embodiment describes the case where each of the HDFS files is table data constituting a table. Each of the HDFS files is composed of one or more files (local files: low-level files) 241. The files 241 are, for example, in a column-oriented data storage format such as Apache Parquet. The embodiment describes an example in which the files 241 are files (Parquet files) in the Apache Parquet format. The files 241 are variable-length files. For example, each of the files 241 has a size in a range of several tens of megabytes (MB) to 1 gigabyte (GB).

Each of the files 241 includes one or more row group data items 242 and meta information 243. Each of the one or more row group data items 242 is data corresponding to a group (row group) including one or more rows constituting a table corresponding to the concerned HDFS file. Each of the one or more row group data items 242 stores data (column data) 2421 related to one or more columns of the row group. The column data 2421 may include data corresponding to one or more values of the one or more columns and a dictionary to be used to compress the one or more values of the one or more columns. For example, when values of columns of the column data 2421 indicate the names of the prefectures of Japan, the dictionary is used to convert the values of the columns into data of numbers indicating the names of the prefectures.

The meta information 243 is arranged at the last portion of the concerned file 241. For example, the meta information 243 includes a data length of the meta information 243, information identifying the position or positions of the one or more row group data items 242, a position of the column data 2421 of the row group, and information indicating type information of the one or more columns. The size of the meta information 243 is in a range of several tens of kilobytes (KB) to several hundreds of kilobytes.

The FPGA controller 220 is configured by causing the CPU 202 to execute the FPGA control middleware. The FPGA controller 220 includes a file path solver 221, a meta information analyzer 222, a necessary column data reader 223, an FPGA command issuer 224, and a result organizer 225.

The FPGA 230 includes a register 231, an input buffer transfer section 232, a data decoder 233, a filter 234, a projection section 235, an aggregator 236, a direct memory access controller (DMAC) 237, an output section 238, and the DRAM 239 as an example of a memory. Each of the components of the FPGA 230 is, for example, formed by a physical circuit.

Next, data processing by the server 200 is described in detail.

For example, when the client node 101 issues an SQL command to the server 200, the DB manager 210 of the server 200 receives the SQL command and outputs a query plan (first command) to be executed by the FPGA 230 to the FPGA controller 220 in the process depicted in FIG. 3. The query plan includes file names (target identification information) of HDFS files to be processed and a processing detail (processing command).

When the FPGA controller 220 receives the query plan output from the DB manager 210, the file path solver 221 executes a process of solving a file name that is among the HDFS file names included in the query plan, corresponds to an HDFS file, and is the name of a file 241 managed by the server 200. Specifically, the file path solver 221 gives the HDFS file name included in the query plan to the distributed file system 240 and acquires the file name of the file 241 corresponding to the HDFS file name from the distributed file system 240. The distributed file system 240 manages information (for example, a table or the like) indicating association relationships between file names of HDFS files and file names of corresponding local files 241. The distributed file system 240 transmits, based on the information, the file name of the local file 241 corresponding to the received HDFS file name.

Then, the meta information analyzer 222 acquires the file 241 from a storage device 205 based on the file name acquired by the file path solver 221, loads the file 241 into the main memory device 203, acquires meta information 243 from the file 241, and identifies the position of a row group, the position of a column, and the like from the meta information 243. When the file path solver 221 acquires multiple file names, the meta information analyzer 222 executes the same process as described above on files having the acquired file names. In this case, immediately after the meta information analyzer 222 completely executes the process on one file, the process may not be executed on another file. For example, when the FPGA 230 almost completely processes the one file, the meta information analyzer 222 may execute the process on the next file.

Then, the necessary column data reader 223 acquires the processing detail of the query plan, identifies a column to be processed based on the processing detail, identifies column data of the column to be processed while treating row groups as units, and reads the identified column data (example of partial data items) into the input buffer 251 that is a buffer to be used for transfer to the FPGA 230 of the main memory device 203. The necessary column data reader 223 may read column data of a next row group into the input buffer 251 after the acquisition of column data of a previously read row group by the FPGA 230 and before or at the time of the next acquisition of data by the FPGA 230 from the input buffer 251. Thus, the FPGA 230 does not wait for the process to be executed by the necessary column data reader 223 in the acquisition of necessary data from the input buffer 251, and data processing can be continuously executed based on FPGA commands. The processing efficiency, therefore, is high.

Then, the FPGA command issuer 224 issues, to the FPGA 230, an FPGA command (second command) including the processing detail and column information including the type and position of the column of the column data stored in the input buffer 251. The FPGA command is a command to process the column data stored in the input buffer 251 or data of one row group. Thus, the FPGA command issuer 224 sequentially issues FPGA commands corresponding to the row groups. Each of the FPGA commands may be issued when a response to a result of executing processing based on a previously issued FPGA command is provided. When a position of the input buffer 251 is not determined in the main memory device 203, an FPGA command may include a top address of the input buffer 251 and a data size.

The FPGA commands issued by the FPGA command issuer 224 are given to the FPGA 230 via the FPGA driver 250.

In the FPGA 230, the input buffer transfer section 232 causes column information of the FPGA commands to be stored in the register 231 and instructs the DMAC 237 to transfer column data to be processed based on the FPGA commands from the input buffer 251 to the DRAM 239.

Then, the DMAC 237 reads the column data from the input buffer 251 into the DRAM 239 in accordance with the instruction.

Then, the data decoder 233 identifies the column data stored in the DRAM 239 based on the column information stored in the register 231. When the column data includes a dictionary, the data decoder 233 decompresses data included in the column data to a value before the compression of the data based on the dictionary.

When a processing detail included in an FPGA command includes a filtering command, the filter 234 filters data decompressed by the data decoder 233 in accordance with the command. When the processing detail included in the FPGA command does not include the filtering command, the filter 234 does not execute the filtering.

When the processing detail included in the FPGA command includes a projection command, the projection section 235 extracts only a necessary column from data decompressed by the data decoder 233 in accordance with the projection command.

The aggregator 236 executes, based on the processing detail of the FPGA command, a process of aggregating process results obtained in the processes by the filter 234 and the projection section 235 and gives the aggregated process results to the output section 238.

The output section 238 gives the process results received from the aggregator 236 to the result organizer 225 of the FPGA controller 220. Specifically, for example, the output section 238 causes the process results to be stored in an output buffer of the main memory device 203. When a position within the output buffer of the main memory device 203 is not determined in advance, the output section 238 may notify the FPGA controller 220 of information indicating a position at which the process results are stored.

In the FPGA controller 220, the result organizer 225 organizes results of the processing executed by the FPGA 230 in accordance with multiple commands generated based on a single query plan. When the result organizer 225 completes the organizing of the results of the processing executed by the FPGA 230 in accordance with all the commands generated based on the single query plan, the result organizer 225 gives the processing results as processing results for the query plan to the DB manager 210. When processing results for all query plans based on an SQL command are obtained, the DB manager 210 transmits the processing results as processing results for the SQL command to the client node 101, as depicted in FIG. 3.

As described above, since data stored in the input buffer 251 and to be processed is transferred to the DRAM 239 and processed by the FPGA 230, it is not necessary that the FPGA 230 have therein a circuit for a file with a large size. Thus, a circuit configuration of the FPGA 230 can be simplified.

The invention is not limited to the aforementioned embodiment and may include modifications and changes without departing from the gist of the invention.

The embodiment describes the case where a dictionary to be used to compress a value is stored in column data. For example, when the value is not compressed, the dictionary may not be stored in the column data.

Although the embodiment describes the example in which the server 200 includes the single FPGA 230, the invention is not limited to this. The server 200 may include multiple FPGAs 230. In this case, multiple FPGA commands based on a query plan may be assigned to each of the FPGAs 230.

In the embodiment, the FPGA controller 220 treats row groups of files as units (partial data items) to be processed in accordance with FPGA commands. The invention, however, is not limited to this. For example, when the sizes of the local files 241 are equal to or smaller than a file size (for example, the size of a buffer of the FPGA 230) receivable by the FPGA 230, each file 241 may be processed in accordance with a respective FPGA command. In addition, each row group may not be treated as a unit, and multiple row groups may be treated as a unit (partial data item) to be processed in accordance with an FPGA command.

The embodiment describes the example in which the FPGA 230 includes the single data decoder 233. The invention, however, is not limited to this. For example, the FPGA 230 may include multiple data decoders 233, and the data decoders 233 may decompress multiple column data items stored in the DRAM 239 in parallel.

The embodiment describes the example in which data of a row group and meta information are managed as the same file. The invention, however, is not limited to this. Data of a row group and meta information may be separately managed. As long as the meta information of the data of the row group is identifiable, the meta information may be managed by an arbitrary method.

The embodiment describes the example in which the FPGA is used as the hardware circuit. The invention, however, is not limited to this. Instead of the FPGA, a dedicated ASIC or GPGPU may be used as the hardware circuit.

The programs described in the embodiment may be installed from a program source. The program source may be a program distribution server or a storage medium (for example, a portable storage medium).

What is claimed is:

1. A data processing device comprising:
a processor;
a main memory device which stores programs to be executed by the processor, wherein the main memory device includes an output buffer;
a hardware circuit connected to the processor, wherein the hardware circuit includes a hardware circuit memory; and
an input buffer that is configured for transferring data to be processed to the hardware circuit based on a command,
wherein the processor is configured to:
acquire a first command including target identification information identifying data to be processed and a processing detail for the data to be processed;
generate, based on the first command, a plurality of second commands to process a plurality of partial data items constituting the data identified by the target identification information and to be processed; and
transmit the second commands to the hardware circuit by causing the partial data items, which are to be processed based on the second command, to be stored in the input buffer for transfer to the hardware circuit, wherein the partial data items are transferred to the hardware circuit memory of the hardware circuit,
wherein the hardware circuit is configured to execute processing on the partial data items based on the transmitted second commands and cause the results of executing the processing to be stored in the output buffer of the main memory device, which is configured to return results of executing the processing to the processor.

2. The data processing device according to claim 1,
wherein the data to be processed based on the first command is table data constituting a table, and includes a plurality of row group data items of a row group including one or more rows of the table data to be processed, and
wherein the partial data items are the row group data items.

3. The data processing device according to claim 2,
wherein meta information capable of identifying positions of the row group data items is stored in association with a file of the data to be processed or the data to be processed, and
wherein the processor is configured to identify, based on the meta information, the positions of the row group data items in the data to be processed, acquire the row group data items, and cause the acquired row group data items to be stored in the buffer of the main memory device.

4. The data processing device according to claim 3,
wherein the meta information further includes information capable of identifying a position of column data in the row group, and
wherein the processor is configured to identify, based on the processing detail of the first command and the meta information, a position of column data necessary for processing indicated by the processing detail within the partial data items, and causes the column data necessary for the processing to be stored in the buffer.

5. The data processing device according to claim 4,
wherein the column data includes data corresponding to a value of a column of the row group and a dictionary indicating a detail of compression of the value of the column, and wherein the hardware circuit is configured to decompress the data corresponding to the value of the column to the value of the column and execute the processing.

6. The data processing device according to claim 5, wherein the data to be processed based on the first command is managed as a high-level file comprised of a plurality of low-level files in a distributed file system, and
wherein the partial data items are the low-level files.

7. The data processing device according to claim 3, wherein the meta information is arranged at the last portion of the file, and
wherein the meta information further includes a data length of the meta information.

8. The data processing device according to claim 1, wherein the processor is configured to organize results of the processing executed by the hardware circuit based on the plurality of second commands generated based on the first command and transmit the results to a requesting source of the first command.

9. The data processing device according to claim 1, wherein the hardware circuit is a programmable gate array.

10. A data processing method by a data processing device including a processor, a main memory device, and a hardware circuit connected to the processor, comprising:
causing the processor to acquire a first command including target identification information identifying data to be processed and a processing detail for the data to be processed;
causing the processor to generate, based on the first command, a plurality of second commands to process a plurality of partial data items constituting the data identified by the target identification information and to be processed;
causing the processor to transmit the second commands to the hardware circuit, wherein the processor causes the partial data items, which are to be processed based on the second commands, to be stored in an input buffer that is used for transferring data to be processed to the hardware circuit, wherein the partial data items are transferred to a hardware circuit memory in the hardware circuit; and
causing the hardware circuit to execute processing on the partial data items based on the transmitted second commands; and
causing the results of executing the processing to be stored in an output buffer of the main memory device, which is used to return results of executing the processing to the processor.

11. The data processing device according to claim 1, wherein the hardware circuit is a dedicated application-specific integrated circuit.

12. The data processing device according to claim 1, wherein the hardware circuit is a dedicated general-purpose computing on graphics processing unit.

13. The data processing device according to claim 1, wherein the hardware circuit memory included in the hardware circuit is dynamic random-access memory.

* * * * *